United States Patent
Vallinen et al.

(10) Patent No.: US 6,985,567 B2
(45) Date of Patent: Jan. 10, 2006

(54) AOC IN ALL-IP NETWORKS

(75) Inventors: Juha Vallinen, Tampere (FI); Kari Rönkä, Tampere (FI); Juha-Pekka Koskinen, Hämeenlinna (FI)

(73) Assignee: Nokia Corporation, Espoo (FI)

( * ) Notice: Subject to any disclaimer, the term of this patent is extended or adjusted under 35 U.S.C. 154(b) by 6 days.

(21) Appl. No.: 10/250,481

(22) PCT Filed: Jan. 3, 2001

(86) PCT No.: PCT/EP01/00018

§ 371 (c)(1),
(2), (4) Date: Dec. 8, 2003

(87) PCT Pub. No.: WO02/054673

PCT Pub. Date: Jul. 11, 2002

(65) Prior Publication Data

US 2004/0087299 A1 May 6, 2004

(51) Int. Cl.
*H04M 15/00* (2006.01)

(52) U.S. Cl. .............................. 379/114.01; 379/114.02; 379/114.1; 379/114.16; 455/405; 455/407

(58) Field of Classification Search ......... 455/405–410; 379/114.01, 114.02, 114.1, 114.14, 133–134, 379/114.16, 115.01, 120, 121.01
See application file for complete search history.

(56) References Cited

U.S. PATENT DOCUMENTS

| | | | | |
|---|---|---|---|---|
| 5,799,072 A | * | 8/1998 | Vulcan et al. | 379/114.02 |
| 6,016,484 A | | 1/2000 | Williams et al. | |
| 6,078,652 A | * | 6/2000 | Barak | 379/114.02 |
| 6,487,401 B2 | * | 11/2002 | Suryanarayana et al. | 455/406 |
| 6,543,686 B1 | * | 4/2003 | Ritter | 235/380 |

OTHER PUBLICATIONS

Jiri Kuthan, "Sample Uses of SIP INFO with Varying Reliability Needs", Internet Engineering Task Force, Oct. 17, 1999, pp. 1–7, XP002181926.

* cited by examiner

*Primary Examiner*—Duc Nguyen
(74) *Attorney, Agent, or Firm*—Squire, Sanders & Dempsey LLP

(57) ABSTRACT

A communications network system and a corresponding method for starting an AoC service of a user are disclosed. The system comprises a control means for sending a protocol message comprising a MIME indication of an AoC application to a user equipment (UE). The user equipment receives the protocol message and activates the AoC application by using the MIME indication.

29 Claims, 2 Drawing Sheets

AOC IN ALL-IP NETWORKS

FIELD OF THE INVENTION

The present invention relates to starting an AoC (Advice of Charge) service of a user in a communications network system, and in particular in an All-IP network system.

BACKGROUND OF THE INVENTION

AoC (Advice of Charge) is a service which provides the means by which a user equipment may indicate the charge that will be made for the use of telecommunication services. In other words, AoC is a user-friendly service which informs an end-user about the cost of a transaction. In All-IP (All-Internet Protocol) networks this kind of service is even more important since there can be several application servers with different charges in the same transaction.

However, due to the fragmented network architecture, AoC cannot be implemented in All-IP networks in the same way as in GSM (Global System for Mobile communications).

SUMMARY OF THE INVENTION

It is therefore an object of the present invention to provide an implementation of AoC which is also suitable for an All-IP network.

According to an aspect of the present invention, this object is achieved by a method of starting an AoC service of a use in a communications network system, comprising the steps of sending a protocol message comprising a MIME indication of an AoC application from a control means to a user equipment UE; and receiving the protocol message at the user equipment and activating the AoC application in the user equipment by the MIME indication.

According to another aspect of the present invention, the above-mentioned object is achieved by a communications network system for starting an AoC service of a user, comprising:

a control means for sending a protocol message comprising a MIME indication of an AoC application to a user equipment UE;

wherein the user equipment receives the protocol message and activates the AoC application by using the MIME indication.

The protocol message may further comprise charging parameters of a service application, and the AoC application may be activated with the charging parameters received at the user equipment.

Moreover, in a protocol message, a service usage request for another service application may be sent from the user equipment to the control means, and the control means may, in a protocol message, return cost information of the application service usage to the user equipment. Then, the user equipment can update the AoC information in accordance with the returned cost information.

When the control means receives the service usage request from the user equipment, it may fetch the cost information about the other service application and calculate new charging parameters and send the new charging parameters as cost information to the user equipment, or just send an add-on parameter set as cost information to the user equipment.

In case of receiving the add-on parameter set, the user equipment combines the initially received charging parameters with the add-on parameter set.

All the protocol messages sent between the user equipment and the control means may be SIP messages or messages of any protocol capable of carrying MIME encoded information between the control means and the UE in a communications network system, e.g. H.323 protocol.

Furthermore, the protocol message comprising the MIME indication may be sent at the beginning of each call.

In addition, the protocol message comprising the MIME indication may be sent when the charging parameters are available in the control means.

According to a further aspect of the present invention, the above-mentioned object is achieved by a control means in a communications network system, wherein said control means is arranged to send a protocol message comprising a MIME indication of an AoC application to a user equipment UE having AoC service.

According to the present invention, a simple and practical implementation of AoC in All-IP networks can be provided. Different AoC applications can be used, which AoC applications can have different MIME versions. AoC applications can be downloaded to the user equipment depending on what kind of charging agreement is selected. If needed, the charging agreement can be changed to be call-specific.

In the following the present invention will be described by way of a preferred embodiment thereof with reference to the accompanying drawings.

DESCRIPTION OF THE PREFERRED EMBODIMENT

The idea of the present invention is to use MIME (Multipurpose Internet Mail Extensions) as an indication for AoC. Initially, the MIME structure was developed for Internet e-mail, but it has a number of features which make it useful to provide a common structure for encoding multimedia data as a MIME-encapsulated message.

The MIME AoC indication is sent to the user equipment in a protocol message, for example a SIP message. SIP (Session Initiation Protocol) is an application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these. SIP invitations used to create sessions carry session descriptions which allow participants to agree on a set of compatible media types. SIP supports user mobility by proxying and redirecting requests to the user's current location. Users can register their current location. SIP is not tied to any particular conference control protocol. SIP is designed to be independent of the lower-layer transport protocol and can be extended with additional capabilities.

As can be seen from the foregoing, SIP is a flexible protocol which enables new methods to implement AoC. According to the present invention, MIME is used as an indication to AoC. The MIME AoC indication may be transferred to the user equipment in a SIP message. However, other protocol messages offering similar possibilities can be used, which can be defined between the required interfaces. When the protocol message including the MIME AoC indication is received at the user equipment, MIME activates the indicated AoC application in the user equipment.

Figure 1:
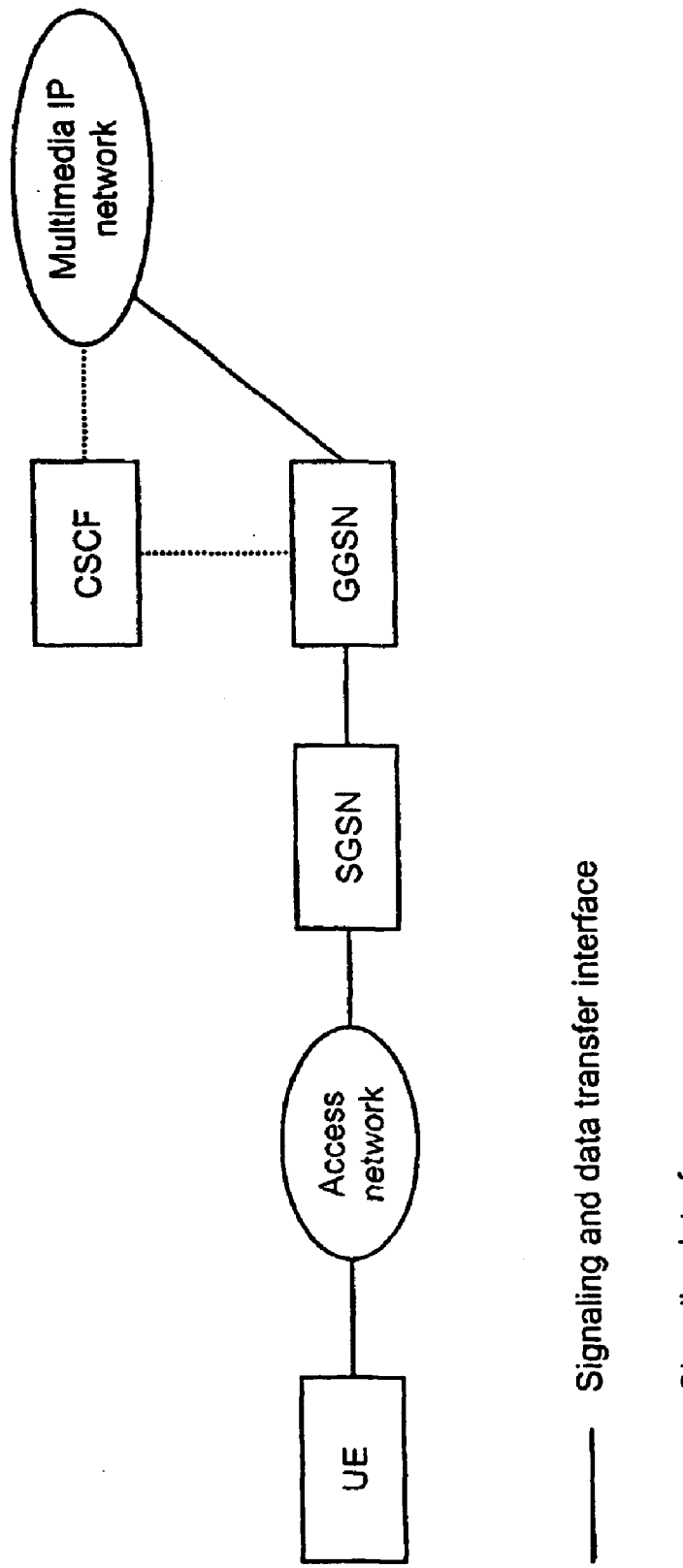
FIG. 1 shows a schematic block diagram of a part of an All-IP network architecture.

FIG. 1 shows part of an All-IP network architecture. In case a user has a call with a service application in a multimedia IP network, the user equipment UE accesses an access network. From the access network, the call connects to a serving node in a core network, for example to an SGSN (Serving GPRS Support Node) in a GPRS (General Packet Radio Service) network. From the SGSN, the call is directed to a gateway, such as an GGSN (Gateway GPRS Support Node) in GPRS, for routing the call to the multimedia IP network. A control means, for example a CSCF (Call State Control Function), performs signaling between the IP network and the GGSN for providing services to the user equipment.

An embodiment of the present invention will be described in the following by referring to FIG. 2.

Figure 2:
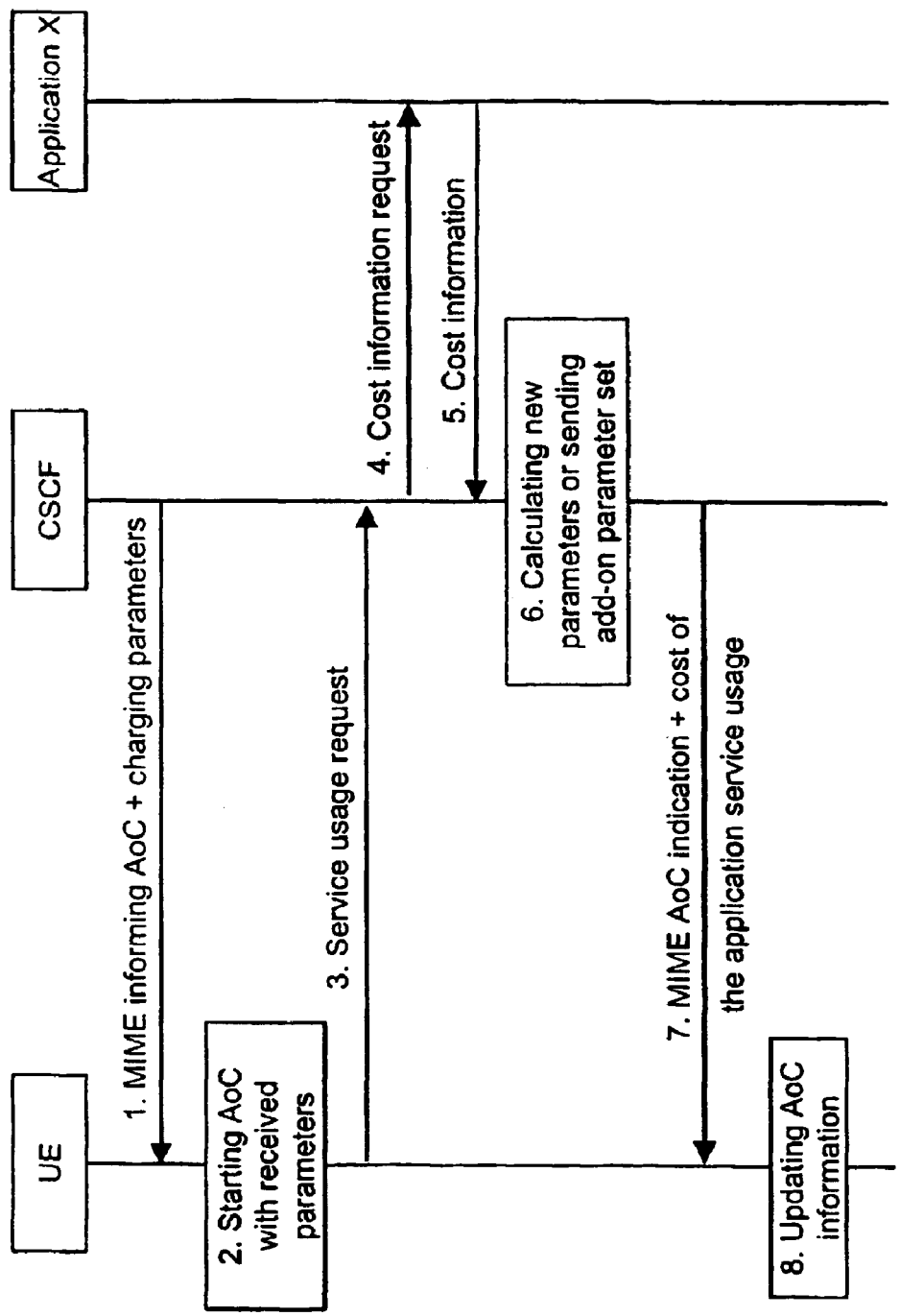
FIG. 2 shows a signaling diagram illustrating an AoC mechanism according to an embodiment of the present invention.

FIG. 2 shows a signaling diagram illustrating the AoC mechanism according to an embodiment of the present invention. The CSCF has information that a user has an AoC service. When charging information is received in the CSCF for a service application in the multimedia IP network, the CSCF sends a SIP message comprising MIME AoC information and charging parameters to the user equipment UE (communication 1 in FIG. 2). Then, the UE starts AoC with the given charging parameters (block 2 in FIG. 2). As a result, information about the cost of the application can be presented to the user.

In case the user wishes another application, for example an application X, a service usage request message is sent from the UE to the CSCF (communication 3 in FIG. 2). Thereupon, the CSCF makes a cost information request at the application X in the IP network (communication 4 in FIG. 2). When the CSCF gets returned the cost information from the application X, the CSCF either combines the tariffs or just sends add-on tariff (block 6 in FIG. 2) to the user equipment in a cost of the application service usage message comprising a MIME AoC indication in order to carry the message in the user equipment to the right application (communication 7 in FIG. 2). Finally, the UE updates the AoC information in accordance with the received new charging parameter set (block 8 in FIG. 2). When the UE receives only the add-on parameter set, it combines the add-on parameters with the initially received charging parameters.

The CSCF may send the SIP message comprising the MIME informing AoC and the charging parameters at the beginning of each call to the user equipment.

The present invention is especially useful in All-IP networks but not limited thereto.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of starting an AoC service of a user in a communications network system, comprising the steps of:
    sending a protocol message comprising a MIME indication of an AoC application from a control means to a user equipment (UE);
    receiving the protocol message at the user equipment; and
    activating the AoC application by the MIME indication in the user equipment with AoC calculated by the user equipment.
2. A method according to claim 1, wherein the protocol message further comprises charging parameters of a service application, and the AoC application is activated with the charging parameters received at the user equipment.
3. A method according to claim 2, further comprising the steps of:
    sending, in a protocol message, a service usage request for another service application from the user equipment to the control means;
    returning, in a protocol message, cost information of the application service usage from the control means to the user equipment; and
    updating the AoC information in the user equipment in accordance with the returned cost information.
4. A method according to claim 3, further comprising the steps of:
    upon receiving the service usage request from the user equipment, fetching the cost information about the other service application and calculating new charging parameters by the control means; and
    sending the new charging parameters as cost information from the control means to the user equipment.
5. A method according to claim 3, further comprising the steps of:
    upon receiving the service usage request from the user equipment, fetching the cost information about the other service application by the control means; and
    sending an add-on parameter set as cost information from the control means to the user equipment.
6. A method according to claim 5, said updating step further comprising the step of:
    combining the initially received charging parameters with the add-on parameter set in the user equipment.
7. A method according to claim 1, wherein the protocol messages are SIP messages.
8. A method according to claim 1, wherein the protocol messages are H.323 messages.
9. A method according to claim 1, wherein the protocol message comprising the MIME indication is sent at the beginning of each call.
10. A method according to claim 2, wherein the protocol message comprising the MIME indication is sent when the charging parameters are available in the control means.
11. A communications network system for starting an AoC service of a user, comprising:
    a control means for sending a protocol message comprising a MIME indication of an AoC application to a user equipment (UE);
    wherein the user equipment receives the protocol message and, by using the MIME indication, activates the AoC application with AoC calculated by the user equipment.
12. A system according to claim 11, wherein the protocol message further comprises charging parameters of a service application, and the user equipment activates the AoC application with the charging parameters received the user equipment.
13. A system according to claim 12, wherein, under the activated AoC application, the user equipment is adapted to send, in a protocol message, a service usage request for another service application to the control means;
    whereupon the control means is adapted to return, in a protocol message, cost information of the application service usage to the user equipment; and
    wherein the user equipment updates the AoC information in accordance with the returned cost information.
14. A system according to claim 13, wherein the control means, upon receiving the service usage request from the user equipment, fetches the cost information about the other service application and calculates new charging parameters and sends the new charging parameters as cost information to the user equipment.

15. A system according to claim 13, wherein the control means, upon receiving the service usage request from the user equipment, fetches the cost information about the other service application and sends an add-on parameter set as cost information to the user equipment.

16. A system according to claim 15, wherein the user equipment, when updating the AoC information, combines the initially received charging parameters with the add-on parameter set.

17. A system according to claim 11, wherein the protocol messages are SIP messages.

18. A system according to claim 11, wherein the protocol messages are H.323 messages.

19. A system according to claim 11, wherein the control means is arranged to send the protocol message comprising the MIME indication at the beginning of each call.

20. A system according to claim 11, wherein the control means is arranged to send the protocol message comprising the MIME indication when the charging parameters are available in the control means.

21. A control means in a communications network system, wherein said control means is arranged to send a protocol message comprising a MIME indication of an AoC application to a user equipment (UE) having AoC service, wherein the MIME indication is arranged to activate the AoC application in the user equipment with AoC calculated by the user equipment.

22. A control means according to claim 21, wherein the protocol message further comprises charging parameters of a service application.

23. A control means according to claim 22, wherein, when said control means receives a service usage request for another service application from the user equipment in a protocol message, said control means is adapted to return cost information of the application service usage to the user equipment in a protocol message.

24. A control means according to claim 23, wherein said control means, upon receiving the service usage request from the user equipment, fetches the cost information about the other service application and calculates new charging parameters and sends the new charging parameters as cost information to the user equipment.

25. A control means according to claim 23, wherein said control means, upon receiving the service usage request from the user equipment, fetches the cost information about the other service application and sends an add-on parameter set as cost information to the user equipment.

26. A control means according to claim 21, wherein the protocol messages are SIP messages.

27. A control means according to claim 21, wherein the protocol messages are H.323 messages.

28. A control means according to claim 21, wherein said control means is arranged to send the protocol message comprising the MIME indication at the beginning of each call.

29. A control means according to claim 21, wherein said control means is arranged to send the protocol message comprising the MIME indication when the charging parameters are available in the control means.

* * * * *